United States Patent

[11] 3,610,196

| | | |
|---|---|---|
| [72] | Inventor | Robert Lowry<br>6720 Van Fleet Drive, McLean, Va. 22101 |
| [21] | Appl. No. | 808,450 |
| [22] | Filed | Mar. 19, 1969 |
| [45] | Patented | Oct. 5, 1971 |

[54] HYDROLOCK SEGMENTED SHIP SYSTEM
6 Claims, 6 Drawing Figs.

[52] U.S. Cl. .............................................. 114/235,
114/77
[51] Int. Cl. .................................... B63b 21/00,
B63h 28/00
[50] Field of Search ......................... 114/77, 235

[56] References Cited
UNITED STATES PATENTS
3,492,964  2/1970  Garcia............................ 114/235
3,485,200  12/1969  Iozza............................ 114/235

FOREIGN PATENTS
1,285,359  1/1962  France ........................ 114/235

Primary Examiner—Trygve M. Blix
Attorney—Fleit, Gipple & Jacobson

ABSTRACT: A segmented ship and including a simple and reliable system for joining the cargo section of said ship with the propulsion section thereof. The connection is made by floating a tongue, forming a part of the power unit, into a slot, forming a part of the cargo unit. The connection is then secured by ballasting the power unit and simultaneously deballasting the cargo unit so that the two units wedge securely into place. The two units are then secured in the connected position by means of securing pins or the like. The present invention further relates to a method for joining the separate units of a segmented ship.

INVENTOR
ROBERT LOWRY

BY Stevens, Davis, Miller & Mosher
ATTORNEYS

INVENTOR
ROBERT LOWRY

HYDROLOCK SEGMENTED SHIP SYSTEM

BACKGROUND OF THE INVENTION

The concept of the segmented water-traversing vessel, wherein the propulsion unit is detachable from the cargo unit, has been known for many years, this concept being analogous to the truck and trailer concept and the locomotive and freight car concept. However, the segmentation of water-going vehicles has never advanced beyond the tug and barge stage. It is thought that this concept has never been applied to large oceangoing vessels because of the fact that a practical connection has never been developed for ensuring a positive joint between the propulsion unit and the cargo unit.

SUMMARY OF THE INVENTION

The present invention relates to a method and an apparatus for joining the cargo section with the propulsion section of a large oceangoing vessel in a manner which is simple and reliable, and which is therefore quite practical. By virtue of having the propulsion section detachable from the cargo-carrying section, one propulsion unit can serve two or more cargo sections similar to a seagoing tugboat and several barges.

One major advantage of such a system over single unit ships is that major utility may be made of the propulsion unit. This unit represents a major portion of the capital investment of the system and substantially all of the operational costs such as fuel, crew, insurance, maintenance and repair.

This system also brings to ocean transportation the advantages of the tugboat and barge concept with the added advantages of high speed, sea worthiness in heavy seas and larger cargo-carrying capacity than is now possible in single seagoing tug and barge units. By means of the present invention, it is possible to join a large high-powered propulsion section to cargo-carrying sections as large and as fast as any existing or contemplated oceangoing vessels.

In accordance with the concept of the present invention, a cargo unit remains in port at all times for loading and unloading, or storing. The power unit arrives at intervals to pick up the outgoing unit and deposit and incoming one. In this manner, the power unit is not required to stand idle during the days when cargo is either being loaded or unloaded Therefore, in ocean-going ships, the productivity is increased substantially.

This productivity increase stems from the fact that the power unit, representing a major portion of the capital investment and almost the entire operating expense, is in productive use 90 to 95 percent of the time. In contradistinction to the above, break bulk ships are operative for only 50 to 60 percent of the time, and tankers, container ships and fast turnaround bulk ships are operative for only 70 to 80 percent of the time.

It is therefore one object of the invention to provide a segmented ship whose cargo-carrying efficiency is far superior to those of presently known oceangoing vessels.

It is a further object of the invention to provide a segmented ship which is simple and reliable and is therefore practical.

As noted above, segmented ships are not new. However, and as also noted above, the industry has not used the segmented ship concept. The reason for this lack of use is that the joining systems tend to be somewhat impractical and unreliable.

It is therefore a further object of the invention to provide a segmented ship having a joining system which is both simple and reliable.

In accordance with the present invention, the cargo section is joined to the propulsion section by a joint which is firmly fixed. Longitudinal bending moments are absorbed by a system of keys and keyways, and a system for securing the segments in their joined state. Racking forces tend to be absorbed by structural slot sides which are firmly wedged against a tongue structure. The integrity of the wedging pressure is maintained by means of the above-noted securing system.

As also noted above, one major disadvantage of the segmented ships known to the prior art is that the joining processes tend to be somewhat complicated.

It is therefore a further object of the invention to provide a segmented ship whose elements are readily joined and separated in a relatively simple manner and without detracting from the strength of the segmented ship as an integral unit.

The joining process comprises the marrying of the two ship sections horizontally. The taper of a slot naturally guides a tongue into place without binding. When the tongue has reached the base of the slot, the propulsion section, which rides in the water somewhat above the cargo-carrying section, is ballasted. Simultaneously, with the ballasting of the propulsion section, the cargo section is deballasted. Thus, the vertical taper of the tongue is tightly forced into the corresponding taper of the slot. When the tongue is firmly in place, securing means are activated, thus completing the mating procedure.

By so providing a segmented ship, the major stress from wave action is carried by the mating surfaces of the two individual units. It is thus readily apparent that the system of the present invention is a significant advancement over those systems known to the prior art. The connections of the prior art, for the most part, concentrate the stress of the connection into pins or latches that necessarily are quite massive and cumbersome in order to be effective.

The present invention thus solves numerous of the problems which plague the portion of the prior art concerned with segmented ships. The improved operation of the segmented ship of the present invention is brought about by means of the joining system.

The propulsion segment is provided with a tongue, and the cargo segment is provided with a slot. The tongue is tapered in a direction parallel to the longitudinal axis of the ship, and is also tapered in a direction parallel to the vertical axis of the ship. The slot is tapered in a manner corresponding to the tapers in the tongue; therefore, the tongue and slot unite in a manner forming smooth and tightly wedged interfaces therebetween.

On the propulsion section, and adjacent the tongue, there are provided a series of keyways, and on the cargo section, adjacent the slot, there are provided a corresponding series of keys. The keys and keyways serve four major functions. First, they assist in guiding the tongue into the slot. Second, they ensure the integrity of the interface between the propulsion section and the cargo section. Third, they absorb the compression and the tension resulting from the longitudinal bending moments associated with the joined ship units. And fourth, they serve as an integral part of the securing system.

Due to the shape of the tongue and its associated keyways, and the corresponding shape of the slot and its associated keys, the propulsion section mates with the cargo section in a manner which may be described as a wedge action. In this way, the stresses which, in the prior art, are concentrated in massive pins or latches, are evenly distributed over the interface between the propulsion and the cargo sections.

The present invention further employs a securing system to maintain the integrity of the smooth interface between the two ship sections. However, while the prior art uses the securing system to absorb stresses between the ship segments, the securing system of the present invention absorbs only a small amount of these stresses, the majority thereof being absorbed at the interface.

As noted above, the present invention contemplates the marriage of a cargo section with a propulsion section in the horizontal plane. It is thus important that the alignment between the two sections, during the uniting operation, be carefully maintained.

It is thus a further object of the present invention to provide means for ensuring the alignment between the propulsion and the cargo units of a segmented ship during the marriage of these units.

In accordance with the above, the keys and keyways are tapered in such a manner that the propulsion unit with its associated keyways is guided into position by the cargo unit and its associated keys.

Further, the propulsion unit is provided with vertical alignment pins and the cargo unit is provided with corresponding alignment slots. Once the cargo and propulsion sections are in readiness for mating, the series of vertical aligning pins are exposed until they penetrate the corresponding aligning slots. Once the pins are fitted within the slots, the mating operation can be perfected in perfect alignment.

The present invention, in addition to the provision of a practical segmented ship, contemplates the provision of a practical method for marrying the separate sections of a segmented ship.

As noted above, the prior art has dealt with segmented ships whose units have been joined in such a manner that the securing systems have had to bear the total burden of absorbing disuniting forces. It has been found, though, that by wedging together the separate units, the bulk of these disuniting forces are transmitted to the structure of the ship itself.

It is therefore a further object of the invention to provide a method for uniting the sections of a segmented ship in a manner which results in a strong and practical joint. This object is perfected by wedging together the two units.

The operation, construction and the above-enumerated objects of the present invention, as well as many of the attendant advantages thereof, will become more readily apparent when reference is made to the following description taken in conjunction with the accompanying drawings.

DETAILED DESCRIPTION OF THE INVENTION

Figure 1:
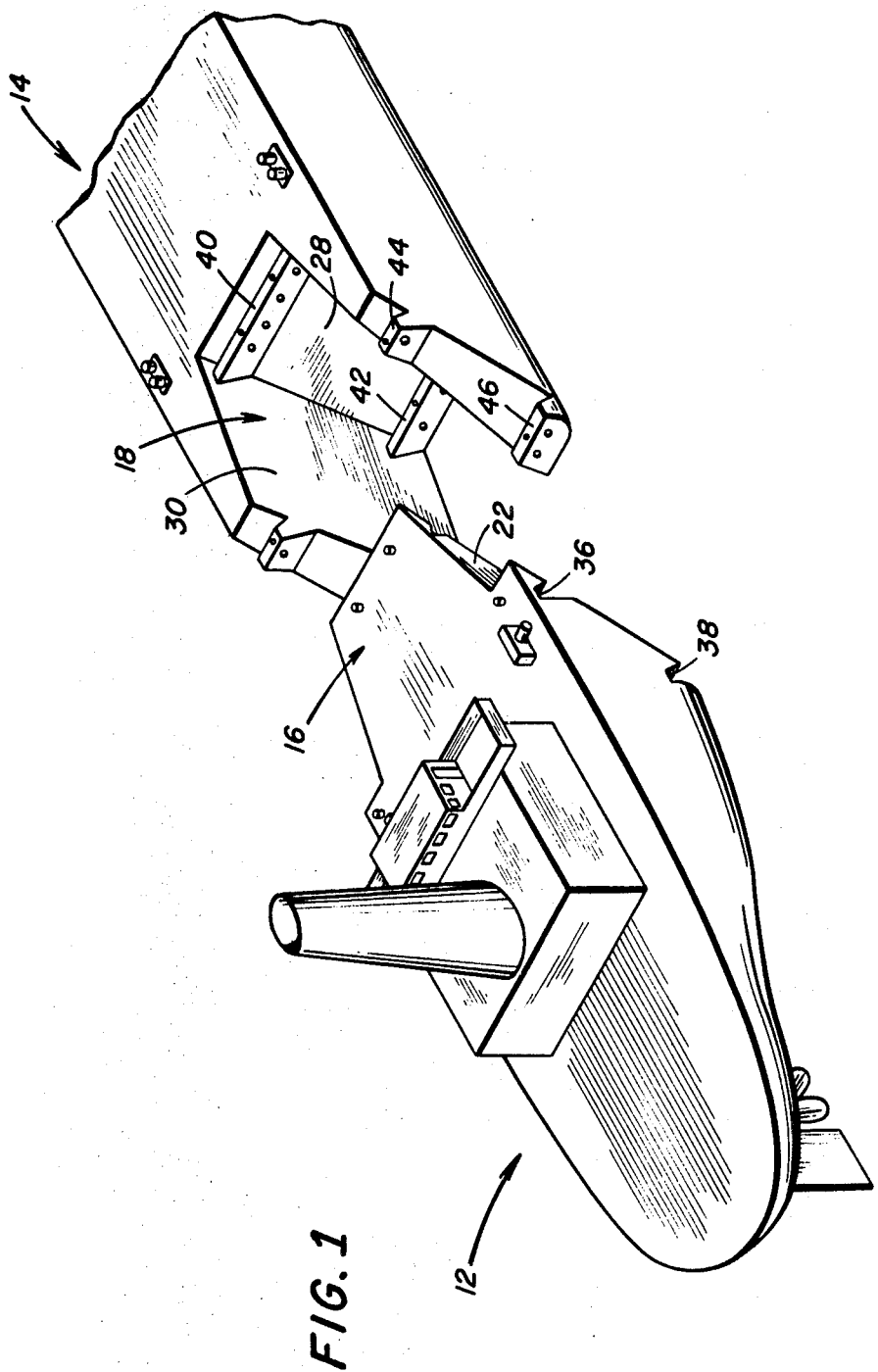
FIG. 1 is a perspective view of the segmented ship of the present invention.

With reference first to FIG. 1, the segmented ship of the present invention is shown generally at 10. The ship 10 comprises, basically, a propulsion section 12 and a cargo section 14.

For purposes of mating, the propulsion section 12 is provided with a tongue structure shown generally at 16 and the cargo section 14 is provided with a slot structure shown generally at 18. As is fully explained below, the tongue 16 is constructed in such a manner that there is provided a double bevel, and, to ensure the best mating arrangement, the slot 18 is correspondingly constructed. As is also explained below, the tongue 16 is provided with a plurality of keyways, and the slot 18 is provided with a plurality of keys, these keys and keyways serving to interlock in such a manner that the tongue 16 tightly wedges within the slot 18 so that the propulsion section 12 positively mates with the cargo section 14.

Figure 2:
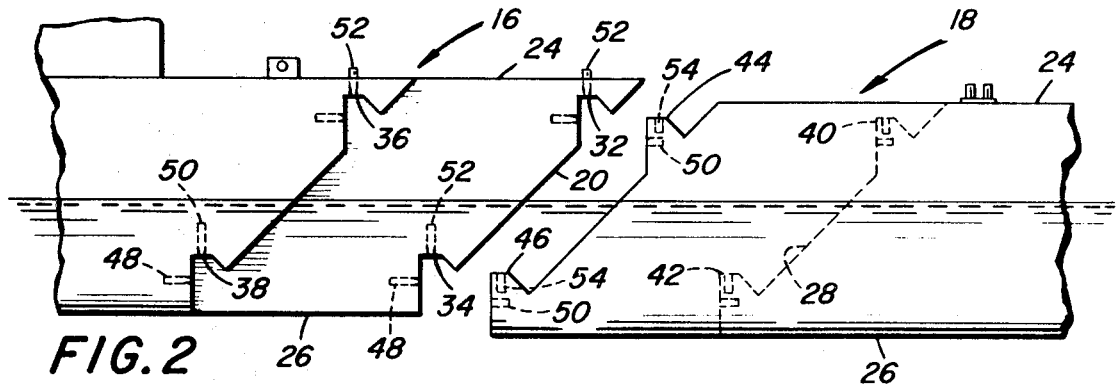
FIG. 2 is a side elevation of the segmented ship in readiness for the joining of its two sections.
Figure 3:
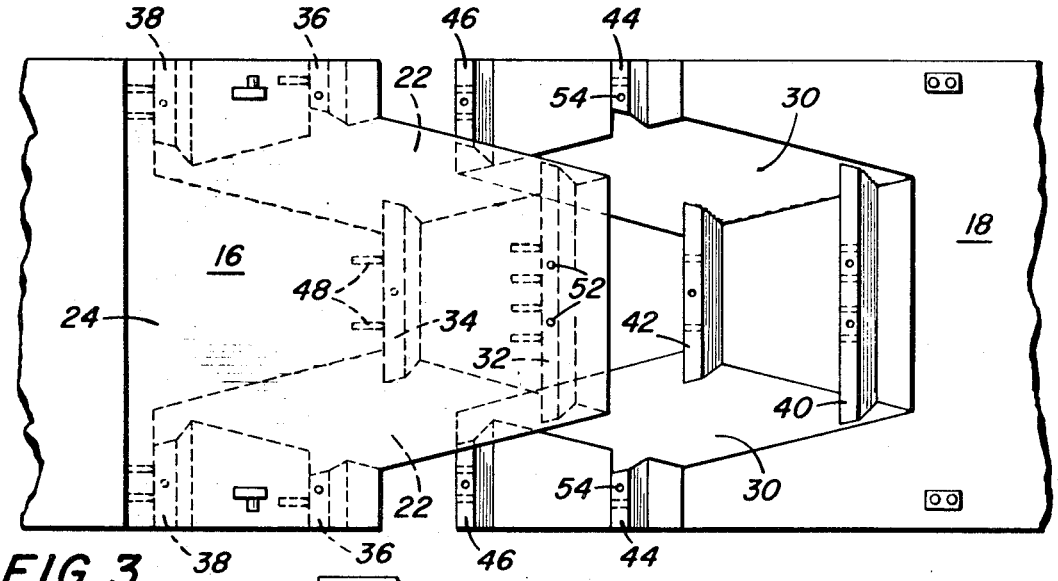
FIG. 3 is a top plan view of the segmented ship shown in FIG. 2.

With reference now to FIGS. 2 and 3, and supplemented by FIG. 1, the configuration of the tongue 16 and the slot 18 are described. The tongue 16 is formed, basically, by an inclined front face 20 and a pair of inclined sidewalls 22. The front face 20 is downwardly and rearwardly inclined, and the sidewalls 22 are downwardly and inwardly inclined. Therefore, the tongue is tapered in a direction parallel to the vertical axis of the ship.

As is best seen in FIGS. 1 and 3, the sidewalls 22 are inclined in a second direction. That is, with respect to the longitudinal axis of the ship, the sidewalls 22 are further inclined inwardly and forwardly. Therefore, the tongue is also tapered in a direction parallel to the longitudinal dimension of the ship.

With continuing reference to FIGS. 2 and 3, supplemented by FIG. 1, the slot 18 is formed, generally, by an inclined rear face 28 and a pair of inclined sidewalls 30. The rear face 28 of the slot 18 is inclined in such a manner that when confronted with the front face 20 of the tongue 16, a smooth and planar interface is formed therebetween. Similarly, the sidewalls 20 of the slot 18 are inclined in such a manner as to form smooth interfaces with the respective sidewalls 22 of the tongue 16.

As is readily apparent when viewing FIGS. 1 through 3, the propulsion section 12 is provided with four keyway systems associated with its tongue 16. More particularly, there is provided a forward central keyway system 32, a rearward central keyway system 34, a forward side keyway system formed by a pair of keyways 36, and a rearward side keyway system formed by a pair of keyways 38. The central keyway 32 and the side keyways 36 are at substantially the same height and are positioned near the deck 24 of the ship, and central keyway 34 and side keyways 38 are at substantially the same height and are positioned near the floor 26 of the ship.

The cargo section 14 is provided with four sets of keys adapted to mate with the keyways provided in the propulsion section 12. More particularly, the cargo section 14 is provided with a forward central key system 40, a rearward central key system 42, a forward side key system comprising a pair of keys 44 and a rearward side key system comprising a pair of keys 46.

The keyways provided in the propulsion section 12 and the keys provided in the cargo section 14 are constructed and positioned in such a manner that for each key there is a corresponding keyway. More particularly, the forward central keyway 32 is adapted to unite with the forward central key 40; the rearward central keyway 34 is adapted to unite with the rearward central key 42; the forward side keyways 36 are adapted to unite with the forward side keys 44; and the rearward side keyways 38 are adapted to unite with the rearward side keys 46.

For reasons which are explained below, each keyway is provided with at least one horizontal securing pin, each pin being housed within a respective bore located in the keyway. These horizontal securing pins are shown at 48. Similarly, each key is provided with at least one horizontal bore 50, each bore serving to receive either a horizontal securing pin 48 or a vertical securing pin 50.

It will be noted that each keyway is also shown to house at least one tapered vertical alignment pin 52 and that each key has at least one corresponding vertical bore 54 for receiving the respective pins 52. These vertical alignment pins are optional and, as explained below, serve basically as alignment devices for maintaining the proper alignment between the propulsion section 12 and the cargo section 14 during the mating operation.

Figure 4:
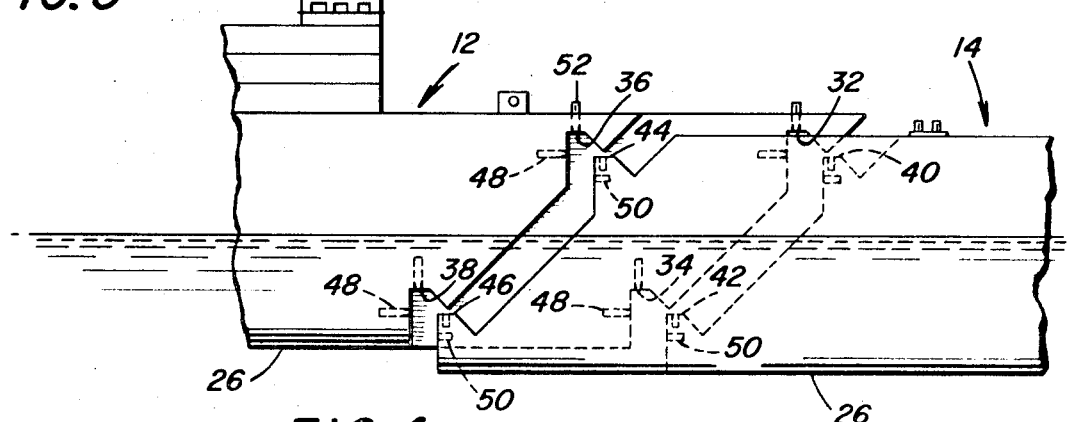
FIG. 4 is a side elevation of the segmented ship during the marriage of its two separate units.

Referring now to FIG. 4, the segmented ship of the present invention is shown during a uniting operation. It will be noted that during the uniting operation, the draught of the propulsion section 12 is somewhat less than the draught of the cargo section 14. This is to allow the keyways associated with the propulsion section 12 to pass over the respective keys associated with the cargo section 14. For example, since the floor 26 of the propulsion section 12 is somewhat higher than the floor 26 of the cargo section 14, so too is the lowest point of the keyway 32 higher than the highest point on the key 44. Thus, a clearance is provided.

During the uniting operation, the propulsion section 12 is moved toward the cargo section 14 until the keyways on the propulsion section 12 are in substantial alignment with the keys on the cargo section 14. After this alignment has been perfected, the vertical alignment pins 52 in the keys, if provided, are caused to enter the respective bores 54 on the keyways. In this manner, the relative motion between the propulsion section 12 and the cargo section 14 is limited to vertical motion. Thus, impact damage to the ship is prevented.

After the alignment pins are in place, if provided, or after the respective sections of the ship 10 are in alignment, if alignment pins are not provided, the propulsion section 12 is ballasted and the cargo section 14 is deballasted. In this manner, the tongue 16 of the propulsion section 12 is caused to wedge tightly into the slot 18 of the cargo section 14 and the keys are caused to wedge tightly into the keyways. In this manner, the power unit and the cargo unit remain parallel and in proper alignment during the joining operation. An upward force is exerted by the cargo unit due to its deballasting and a downward force is exerted the propulsion unit due to its ballasting. Consequently, the pitch of the cargo section and the pitch of the propulsion section remain equal during the marriage of the two sections.

After the propulsion section and the cargo section are tightly wedged together, the horizontal securing pins are moved (by means not shown) and are caused to bridge the interface between the propulsion section and the cargo section. In this manner, the securing pins ensure that the tight fit between the cargo section and the propulsion section is maintained.

Figure 5:
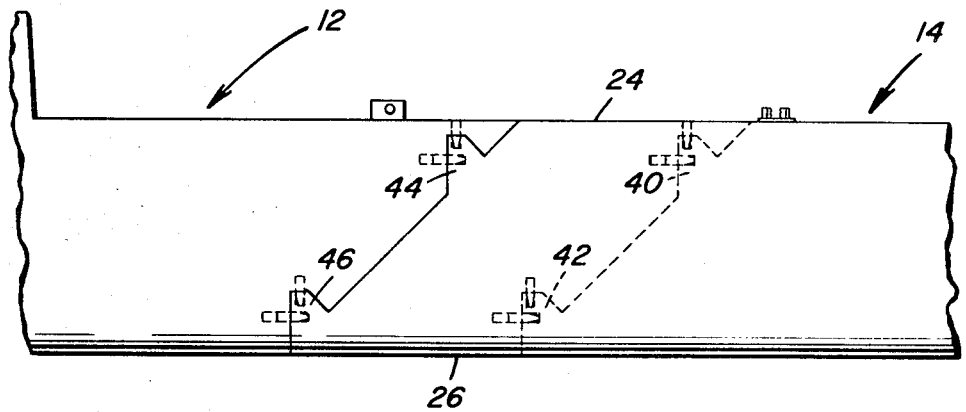
FIG. 5 is a side elevation of the segmented ship after the marriage is completed.
Figure 6:
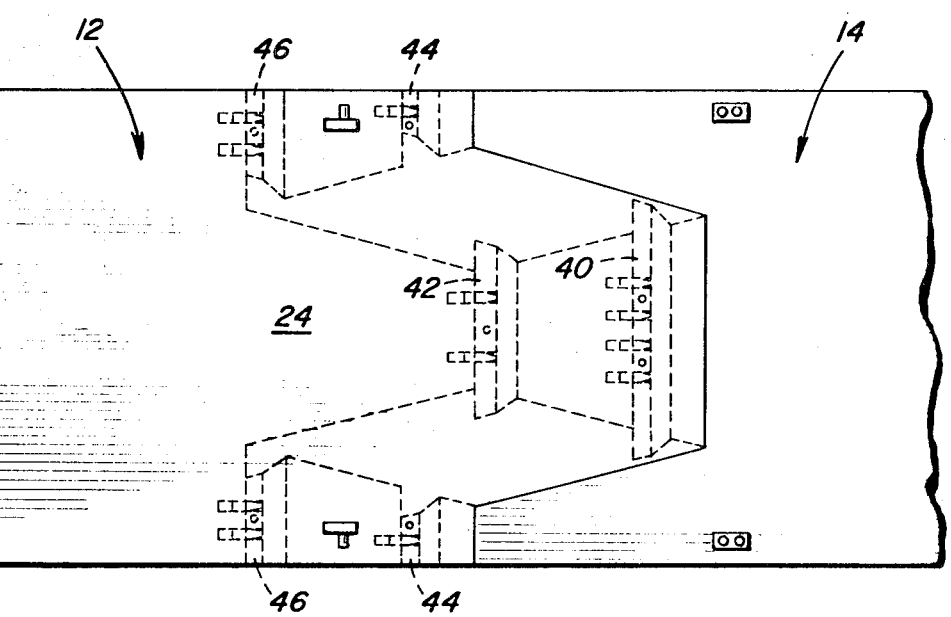
FIG. 6 is a top plan view of the segmented ship shown in FIG. 5.

The segmented ship, as it appears when the cargo section and the propulsion section are wedged together, can be seen with reference to FIGS. 5 and 6. There, the propulsion section 12 and the cargo section 14, when united, define a continuous deck 24 and a continuous floor 26. As is evident when viewing FIGS. 5 and 6, the key and keyway systems are secured by the horizontal securing pins 48 which bridge the gap between the propulsion section 12 and the cargo section 14. In this manner, relative movement between the propulsion section and the deck section in the vertical direction is prevented. Another factor tending to maintain the tight fit between the two sections is that the keys and keyways lock together in a manner preventing horizontal relative motion between the sections.

It will be noted, due to the double bevel of the tongue 16 and the corresponding double bevel of the slot 18, the propulsion section 12 tightly wedges with the cargo section 14. The keyways of the propulsion section 12 mate with the keys of the cargo section 14; the tongue 16 of the propulsion section 12 wedges in the slot 18 of the cargo section 14, in a direction parallel to the transverse dimension of the ship; and the tongue 16 of the propulsion section 12 wedges in the slot 18 of the cargo section 14, in a direction parallel to the vertical dimension of the ship. Once this dual wedging action is perfected, the placement of the horizontal securing pins and the action of the keys and keyways ensures that the two segments of the ship are maintained tightly in position.

By providing a segmented ship with the wedging system of the present invention, the joint is firmly fixed. More particularly, longitudinal bending moments are absorbed by the system of keys, keyways and the horizontal securing pins. Furthermore, racking forces are absorbed by the structural slot sides which are firmly wedged against the tongue structure. The integrity of the wedging pressure is maintained by the securing system.

Since the joining process involves first a horizontal movement and then a vertical movement, the taper of the slot naturally guides the tongue into wedging position without binding. When, however, the propulsion section is ballasted and the cargo section deballasted, the vertical taper of the tongue is tightly forced into the slot. A secure coupling is ensured due to a wedging action.

An additional advantage of the present invention is that while the propulsion and the cargo sections of the segmented ship are held tightly in position by the double-wedging action and the securing pins, the disuniting operation is very easily accomplished. More particularly, the disuniting is performed by carrying out the uniting steps in their reverse order.

While the present invention has been described with reference to a particular embodiment, it should be understood that many alternations and modifications may be practiced without departing from the spirit and scope thereof. It is therefore the intent that the present invention not be limited to the above, but only be limited as defined in the appended claims.

What is claimed is:

1. A segmented ship comprising a propulsion section, a cargo section, means for wedging together said propulsion section and said cargo section to join same, said means including two sets of complementary inclined flat surfaces on corresponding portions of said propulsion section and said cargo section such that the wedging together takes place by overlapping one set of complementary surfaces with the other set of complementary surfaces and moving said sets of surfaces vertically relative to one another, one of said sets comprising a transverse taper constituted by flat surfaces inclined longitudinally and upwardly and the other of said sets comprising a longitudinal taper constituted by flat surfaces inclined upwardly and outwardly and longitudinally and inwardly, and means for interlocking said sections.

2. A segmented ship according to claim 1 wherein said means for interlocking said sections comprises a key and keyway.

3. A segmented ship according to claim 2 wherein pins align and secure said key in said keyway.

4. A segmented ship according to claim 1 wherein said means for interlocking said sections includes at least a forward central key and keyway system and a rear central key and keyway system.

5. A segmented ship according to claim 4 wherein said means for interlocking said sections further includes a forward side key and keyway system and a rear side key and keyway system.

6. A segmented ship according to claim 5 wherein pins secure and align said keys in said keyways.